United States Patent [19]

Girodin

[11] Patent Number: 4,807,902
[45] Date of Patent: Feb. 28, 1989

[54] SUSPENSION FOR A WHEELED VEHICLE

[76] Inventor: Marius Girodin, 99 Bld. H. Barbusse, F-78800 Houilles, France

[21] Appl. No.: 76,582

[22] Filed: Jul. 23, 1987

[30] Foreign Application Priority Data

Jul. 25, 1986 [FR] France ................................ 8610784

[51] Int. Cl.$^4$ ............................................. B60G 3/00
[52] U.S. Cl. ................................... 280/701; 280/688
[58] Field of Search ...................... 280/688, 690, 701

[56] References Cited

FOREIGN PATENT DOCUMENTS

| | | | |
|---|---|---|---|
| 1038926 | 9/1958 | Fed. Rep. of Germany | ...... 280/690 |
| 2602717 | 7/1977 | Fed. Rep. of Germany | . |
| 589320 | 5/1925 | France | . |
| 624121 | 11/1928 | France | . |
| 1281427 | 12/1961 | France | . |
| 2410572 | 6/1979 | France | . |
| 2547249 | 12/1984 | France | . |
| 1087372 | 4/1984 | U.S.S.R. | ............................ 280/688 |

Primary Examiner—David M. Mitchell
Assistant Examiner—Ross Weaver
Attorney, Agent, or Firm—Townsend and Townsend

[57] ABSTRACT

Suspension for a wheeled vehicle, each wheel (4) of which is supported by the end of a lever such as (5) articulated on a transverse axis such as (9), the wheel lever (5) forming a solid unit with another central lever likewise oscillating about the same axis (9), the end (16) of which central lever is connected to a floating single longitudinal elastic member (21) by means of a control bar (18), the oscillation pin (19) of which is connected to one end of the elastic member (21) by the shackle (20).

11 Claims, 1 Drawing Sheet

Fig. 1
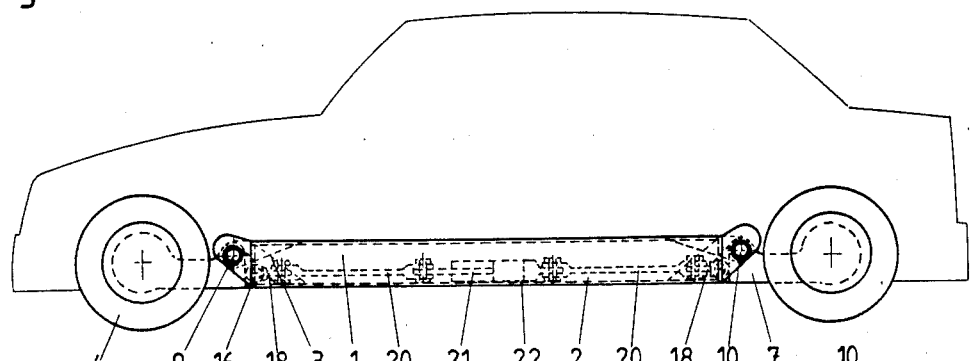
Fig. 2
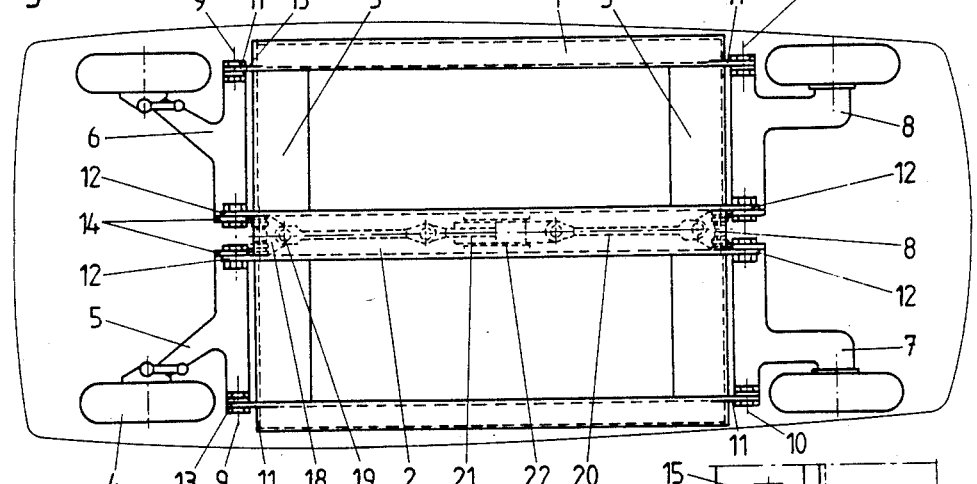
Fig. 3
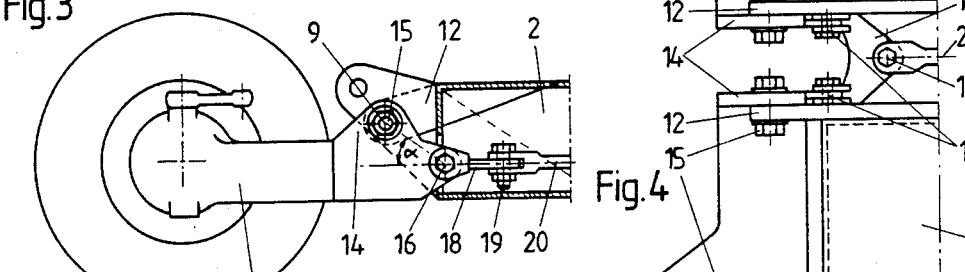
Fig. 4
Fig. 5
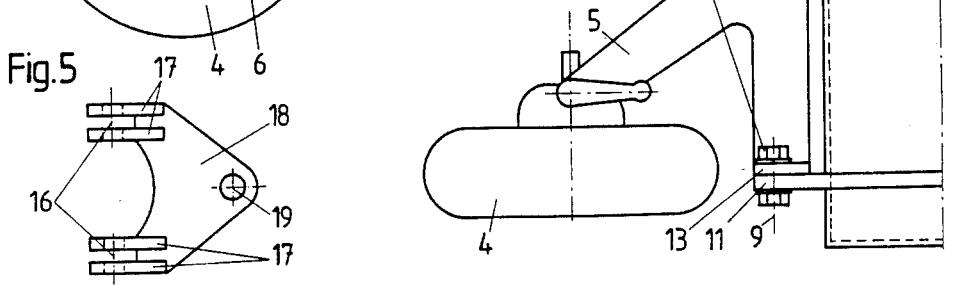

SUSPENSION FOR A WHEELED VEHICLE

It is the current practice to connect the wheels of wheeled vehicles, in particular of cars, to the chassis by levers which are appropriately articulated to the latter. The forces acting on each wheel are transmitted to the chassis by an elastic member close to the wheel itself.

There are in existence several cases of connection of the wheels two by two: torsion bars, lateral longitudinal springs.

In all cases, the forces on a wheel are transmitted to the chassis, whether or not in their entirety, in the vicinity of each wheel.

The result of this is that the forces acting on each wheel are borne by the elastic member corresponding to the said wheel and are transferred to the chassis at a large distance from the overall centre of gravity. This gives rise to the need for a chassis which is rigid over a great length and for four systems of complex elastic devices for vehicles having four wheels.

The invention forming the subject of the present patent reduces these disadvantages.

It is characterized in that each wheel is connected to the chassis by a lever, the axis of articulation of which on the chassis is perpendicular to the longitudinal median plane of the vehicle, another lever forming a solid unit with the first lever transmitting the couple of the forces acting on the wheel to an elastic member situated longitudinally in the plane of symmetry, or close to this plane of symmetry, of the vehicle.

According to a further feature of the invention, the elastic member is single and is situated preferably in the plane of symmetry of the vehicle, the couple levers of the front wheels being connected to its front and the couple levers of the rear wheels being connected to its rear, by appropriate longitudinal rods.

According to the invention, this elastic member, spring or jack, is not connected to the chassis and is floating between the connections to the front wheels and to the rear wheels. According to the invention, the couple levers of the front or rear wheels are articulated directly or by means of connecting rods on each side of the plane of symmetry on a component having, through its axis, the shape of an isosceles triangle, each couple lever being connected to a vertex of the base of the said isosceles triangle, the vertex of which is connected to the elastic member. This intermediate distributing member according to the invention acts as a control bar, the articulation of which is at the appropriate distance from its arm and permits the wheels to be kinematically independent of one another while automatically transferring the effort, which is on average constant, of the elastic member to the wheel disposed in an upward direction.

According to the invention, the angle transferred onto a vertical plane perpendicular to the articulations of the levers on the chassis, of the said levers and of the couple levers, is preferably close to 135°.

According to the invention, the articulation of the levers on the chassis is preferably higher, in relation to the ground, than the axis of the corresponding wheels. Further features of the invention will become evident in the course of the description which follows and which is given solely by way of an exemplary embodiment.

On the single sheet of drawings:

FIG. 1 is a side elevation of the chassis of a vehicle having four wheels, which may be a car, the contour of which is shown in outline;

FIG. 2 is a plan view of the same chassis;

FIG. 3 is a partial axial cross-section according to AA of FIG. 2, permitting illustration, on a larger scale viewed from the interior, of a front wheel, its levers and the various axes and articulations;

FIG. 4 is a partial plan view of a front wheel together with its various levers and articulations on the same scale as FIG. 3;

FIG. 5 is a plan view, on a larger scale, of a control bar for connecting the front wheels to the elastic member.

In FIGS. 1, 2, 3 and 4, 5 the bottom platform chassis is formed by the longitudinal lateral box members of rectangular cross-section (1), by the longitudinal central box member of rectangular cross-section (2) and by the transverse box members having ends of triangular cross-section (3).

The wheels (4) are carried at the front by levers (5) and (6) which are articulated on the common axis (9) perpendicular to the median plane according to the invention. They are carried at the rear by the levers (7) and (8) which are articulated on the common axis (10) perpendicular to the median plane according to the invention. In the embodiment shown, the axis (9) is formed by the coaxial bores of the external connectors (11) in the extension of the internal webs of the box members (1) and the internal connectors (12) in the extension of the webs of the central box member (2).

The articulations of the levers (5) and (6) on the axis (9) are formed in the case of each lever by bores of connectors having their end (13) on the external transverse box member and (14) on the internal transverse box member, these bores being situated above the transverse box member.

The bins (15) permit oscillation of the levers (5) and (6) about (9) by means of the connectors (11) and (13) as well as (12) and (14).

Each end connector (14) on the internal transverse box member carries a second bore, which is generally designated by (16) and which is situated substantially in the central plane of the wheel lever, between the latter and the chassis.

The angle projected onto the median plane derived from the plane formed by (9) and (16) and the central plane of the lever is approximately 40°. Each couple lever is thus constructed by the arrangement of (15) and (16) on the end connectors (14) of internal box members.

In the example shown, each couple lever end articulation (16) is articulated in each end joint (17) of the floating control bar (18), the central articulation (19) of which is connected by the shackle (20) to the elastic member (21).

The descriptions and the components are the same for the rear wheels. The elastic member (21) is a jack operating in traction or a spring. It rests on the support (22), without being linked thereto.

Let us suppose that the right-hand front wheel, on passing over a hump, will rise, thus increasing the angle α of the plane (9) (16) with the horizontal.

As the rear wheels are not stressed, the elastic member (21) supplies a constant restoring force, which acts via the pin (19) on the control bar (18). The restoration of the right-hand wheel which has been raised takes place under two actions:

(1) the increase in α increases the distance from the axis of the shackle (20) to the axis (9), and thus the restoring couple at a constant restoring force.

(2) The right-hand part of the control bar (18) advances, the effect of which is to displace towards the right the bearing pin (19) of the shackle (20), the force of which will be transferred to the restoring lever of the right-hand wheel, being added to the couple due to the increase in the effective lever arm.

The supplementary restoring forces acting on the raised wheel are subjected from those acting on the wheel articulated on the same axis, in such a manner that the pulse on the chassis is considerably reduced.

This results in a very smooth suspension, which is nevertheless rigid in displacement.

I claim:

1. A suspension for a four-wheeled vehicle, comprising:
    a single elastic member, having first and second ends, situated longitudinal to the vehicle in common to the four wheels;
    a first transmission element attached to said first end of said elastic member, and a second transmission element attached to the second end of said elastic member;
    first, second, third and fourth lever means, one of said lever means supporting each said wheel, each said lever means pivoting about an axis traverse to the vehicle and comprising a wheel lever and a couple lever integral therewith, said first and second lever means being articulatably attached to said first transmission element, said third and fourth lever means being articulatably attached to said second transmission element;
    the action of one wheel upon said wheel's corresponding lever means transmitting a couple by articulation around the corresponding axis to the corresponding couple lever, which lever is connected by the first or second transmission elements to said elastic member.

2. A suspension according to claim 1, wherein said vehicle includes a chassis, and said single elastic member is able to move freely without connection to said chassis.

3. A suspension according to claim 1, wherein said first and second transmission elements are triangular shaped control bars, and wherein the action of said single elastic member is exerted upon the front or rear wheels by means of said first or second transmission elements.

4. A suspension according to claim 1, wherein each said first and second transmission element includes a base having an end, and each said couple lever includes an end that is connected to said end of said base of said corresponding transmission element.

5. A suspension according to claim 1, wherein in a central position said couple lever forms an angle $\alpha$ with the longitudinal axis of said elastic member of approximately 40 degrees.

6. A suspension according to claim 3, wherein each said triangular shaped control bar includes a vertex having a central articulation pin subjected to the action of said single elastic member.

7. A suspension for a four-wheeled vehicle having a longitudinal vehicle axis, comprising:
    a single elastic member, having first and second ends, situated longitudinal to the vehicle and common to the four wheels;
    first and second triangular shaped control bars pivotably attached to the first and second ends of said elastic member respectively; and
    first, second, third and fourth lever means supporting said wheels, each lever means pivoting about an axis traverse to the vehicle axis and comprising a wheel lever and a couple lever integral therewith, said first and second lever means being articulatably attached to said first transmission element, said third and fourth lever means being articulatably attached to said second transmission element, a couple resulting from the action of one wheel on the corresponding wheel lever being transmitted by articulation around the corresponding axis to the corresponding couple lever, which is connected by means of said triangular control bars to said elastic member.

8. A suspension according to claim 7, wherein said vehicle includes a chassis, and said single elastic member can move freely without connection to said chassis.

9. A suspension according to claim 7, wherein each triangular shaped control bar includes a base having an end, and the end of each said couple lever is connected to the end of the base of a corresponding control bar.

10. A suspension according to claim 7, wherein the a central position the angle $\alpha$ of the couple lever with the axis of the elastic member is approximately 40 degrees.

11. A suspension according to claim 7, wherein each said triangular shaped control bar includes a vertex having a central articulation pin subjected to the action of said single elastic member.

* * * * *